United States Patent
Jebasinski

(10) Patent No.: US 9,238,205 B2
(45) Date of Patent: Jan. 19, 2016

(54) MIXER AND EXHAUST SYSTEM

(75) Inventor: Rolf Jebasinski, Filderstadt (DE)

(73) Assignee: Eberspächer Exhaust Technology GMBH & CO. KG, Neunkirchen (DE)

(*) Notice: Subject to any disclaimer, the term of this patent is extended or adjusted under 35 U.S.C. 154(b) by 404 days.

(21) Appl. No.: 13/086,476

(22) Filed: Apr. 14, 2011

(65) Prior Publication Data

US 2011/0283686 A1    Nov. 24, 2011

(30) Foreign Application Priority Data

May 19, 2010  (DE) .......................... 10 2010 021 040

(51) Int. Cl.
| | |
|---|---|
| *F01N 1/00* | (2006.01) |
| *B01F 3/04* | (2006.01) |
| *B01F 5/04* | (2006.01) |
| *B01F 5/06* | (2006.01) |
| *F01N 3/28* | (2006.01) |

(52) U.S. Cl.
CPC ............ *B01F 3/04049* (2013.01); *B01F 5/0451* (2013.01); *B01F 5/0611* (2013.01); *B01F 5/0616* (2013.01); *B01D 2251/20* (2013.01); *B01D 2251/208* (2013.01); *B01F 2005/0628* (2013.01); *B01F 2005/0639* (2013.01); *F01N 3/2892* (2013.01); *F01N 2240/20* (2013.01); *F01N 2610/02* (2013.01)

(58) Field of Classification Search
CPC .. B01F 3/04049; B01F 5/0451; B01F 5/0617; B01F 2005/0628; B01F 2005/0639; B01D 2251/20; B01D 2251/208; F01N 2610/02; F01N 3/2892

USPC ............................................................ 60/324
See application file for complete search history.

(56) References Cited

U.S. PATENT DOCUMENTS

| | | | |
|---|---|---|---|
| 6,449,947 B1 * | 9/2002 | Liu et al. ........................ | 60/286 |
| 2009/0183496 A1 | 7/2009 | Arakawa et al. | |
| 2010/0071352 A1 | 3/2010 | Tatur et al. | |
| 2011/0258983 A1 * | 10/2011 | Vosz ............................... | 60/274 |

FOREIGN PATENT DOCUMENTS

| | | |
|---|---|---|
| DE | 39 40 747 C1 | 7/1990 |
| DE | 10 2004 038140 A1 | 3/2005 |
| DE | 102008017395 A1 * | 10/2009 |

(Continued)

OTHER PUBLICATIONS

English Translation of DE 102008017395A1.*

(Continued)

*Primary Examiner* — Jason Shanske
(74) *Attorney, Agent, or Firm* — McGlew and Tuttle, P.C.

(57) ABSTRACT

A static mixer for the through-mixing of a flow in a line conducting the flow, more preferably of an exhaust system of a combustion engine with several guide vanes. To create adequate through-mixing at low flow velocity and a through-flow resistance that is not too high at high flow velocity, the guide vanes are produced of a shape memory alloy wherein below a predetermined limit temperature the guide vanes have at least one low-temperature shape and above the limit temperature the guide vanes have at least one high-temperature shape, which differs from the low-temperature shape through a reduced through-flow resistance of the mixer.

18 Claims, 2 Drawing Sheets

(56) References Cited

FOREIGN PATENT DOCUMENTS

| DE | 102008017395 A1 | 10/2009 |
| EP | 1 760 284 A2 | 3/2007 |
| GB | 2 236 690 A | 4/1991 |
| JP | 10-231721 A | 9/1998 |
| JP | 10231721 A * | 9/1998 |
| JP | 10-299465 A | 11/1998 |

OTHER PUBLICATIONS

English Translation of JP 10231721A.*
English translation of German Patent DE 3940747 C1.*

* cited by examiner

MIXER AND EXHAUST SYSTEM

CROSS REFERENCE TO RELATED APPLICATIONS

This application claims the benefit of priority under 35 U.S.C. §119 of German Patent Application 10 2010 021 040.4 filed May 19, 2010, the entire contents of which are incorporated herein by reference.

FIELD OF THE INVENTION

The present invention relates to a static mixer for the through-mixing of a flow in a line conducting the flow, particularly of an exhaust system of a combustion engine, the static mixer including several guide vanes. The invention additionally relates to an exhaust system for a combustion engine equipped with such a mixer, more preferably of a motor vehicle.

BACKGROUND OF THE INVENTION

In many technical fields it is required to homogenize a multi-phase flow. To this end, a mixer can be arranged in a stationary manner in a line conducting the flow, through which mixer the flow flows and in the process mixes the individual phases of the flow, which leads to the desired homogenization. Such a mixer arranged in a stationary manner subjected to a through flow is also described as static mixer. The static mixer can for example be used for the mixing of a flow having two or more fluid phases. For example, it can be that two different gases or two different liquids have to be thoroughly mixed. It is likewise conceivable to thoroughly mix at least one liquid phase with at least one gas phase, wherein at the same time the aim can be an evaporation of the liquid phase.

With modern exhaust systems a reduction of nitric oxides can be realized with the help of an SCR-catalytic converter in connection with a reduction agent fed to the exhaust gas flow. A suitable reduction agent for example is ammonia, which is preferably fed to the hot exhaust gas in liquid form in the form of a watery urea solution. In particular, the watery urea solution is injected into the exhaust gas flow. Up to the SCR-catalytic converter the injected urea solution is to be completely evaporated and homogeneously distributed in the exhaust gas flow in order to be able to realize the desired reduction of the nitric oxides. In order for this evaporation and homogenization to be realisable over as short as possible a distance, static mixers can be employed. The respective static mixer is then positioned downstream of an injection device for injecting the reduction agent and upstream of the SCR-catalytic converter.

Another possible application arises during the regeneration of particle filters, which for this purpose have to be heated to a self-igniting temperature of the deposited particles. For this purpose, an oxidation catalytic converter can be arranged upstream of the respective particle filter with which fuel can be exothermically converted, which for this purpose is injected upstream through nozzles. Because of this, the exhaust gas is greatly heated and the exhaust gas then transports the heat to the particle filter located downstream in order to heat the latter. For this application, too, mixing and evaporation of the nozzle-injected fuel with the exhaust gas is advantageous.

The use of such mixers in the exhaust system however is problematic. In order to be able to achieve an adequate homogenization even with relatively low exhaust temperatures and comparatively low flow velocities the mixer must possess a particularly high effectiveness which however is accompanied by a comparatively high through-flow resistance. At higher flow velocities, this leads to a considerable drop in power of the combustion engine. In addition it can be advantageous to arrange guide vanes of the mixer in the cross section that can be subjected to the through-flow so that in a projection of the guide vanes orientated parallel to the line longitudinal direction it is largely covered. In this manner, the risk for example of a droplet strike-through at low exhaust gas temperatures can be reduced. Such a largely "view-tight" arrangement of the guide vanes likewise results in a high through-flow resistance.

From DE 10 2008 017 395 A1 such a static mixer for the mixing of a flow in a line conducting the flow, particularly of an exhaust system of a combustion engine, is known, which comprises several guide vanes which with the known mixer are produced of usual steel plate.

SUMMARY OF THE INVENTION

The present invention deals with the problem of providing an improved embodiment for a static mixer or for an exhaust system equipped with such, which is more preferably characterized in that the mixer on the one hand has an adequate mixing effect even at lower flow velocities while on the other hand it has a reduced through-flow resistance, particularly at higher flow velocities.

The invention is based on the general idea of producing the guide vanes of the mixer from a shape memory alloy namely in such a manner that they at least comprise one low-temperature shape and at least one high-temperature shape, which for the mixer create different through-flow resistances. Below a predetermined limit temperature the guide vanes have a low-temperature shape that has a comparatively high through-flow resistance. Above the predetermined limit temperature the guide vanes have a high-temperature shape which has a comparatively low through-flow resistance. The high through-flow resistance, with corresponding configuration of the guide vanes, is accompanied by a higher mixing effectiveness. In this manner it is ensured that below the limit temperature an effective mixing of the flow takes place. The effectiveness of the mixing with low flow-through resistance is correspondingly reduced. The present invention is based on the realization that the exhaust gas temperature on the one hand correlates with the load of the combustion engine and on the other hand also with the rotational speed of the combustion engine. This means that at high flow velocities high exhaust gas temperatures also occur as a rule, while comparatively cold exhaust gases regularly occur only at low flow velocities. At high flow velocities a mixer with reduced mixing effect can also achieve an adequate mixing of the flow. At the same time, the high exhaust gas temperatures improve the droplet evaporation and consequently reduce the danger of a droplet strike-through.

The invention thus presents a mixer which in a special manner is suitable for use in an exhaust system, since at low exhaust gas temperatures it automatically assumes a high-temperature configuration which is characterized by a reduced flow resistance. The through-flow resistance elevated in the low-temperature configuration does not interfere here since low exhaust gas temperatures regularly only occur when the full power of the combustion engine is not demanded. A reduced mixing effectiveness of the high-temperature configuration can also be accepted since this is more or less compensated through the higher flow velocities and higher exhaust gas temperatures with respect to the homogenization to be achieved.

Shape memory alloys are generally known and can also be called memory metal. In English usage the designation "shape memory alloy" or the abbreviation "SMA" is found.

According to an advantageous embodiment the shape memory alloy can be selected so that the guide vanes with rising temperature increasingly change their shape in the direction of decreasing through-flow resistance. In other words, the guide vanes change their shape proportionally to the temperature in such a manner that with increasing temperature the through-flow resistance decreases.

With an alternative embodiment the shape memory alloy can be designed as a two-shape memory alloy in such a manner that the guide vanes, except for thermal expansion effects and except for transition states in the region of the limit temperature, below the limit temperature only have a single low-temperature shape and above the limit temperature only a single high-temperature shape. In other words, the guide vanes only possess the two shapes between which they quasi digitally change over dependent on the temperature. It is clear that in the region of the limit temperature transient shapes occur since a sudden change-over is not physically possible. However, compared to the embodiment with quasi analogue relationship between temperature change and shape change described above is relatively small and can for example comprise a temperature range of plus minus 10% of the limit temperature.

It is clear that depending on the design of the shape memory alloy the transition between the design with analogue relationship between temperature change and shape change and the design with digital relationship between temperature change and shape change can be fluid.

With an advantageous embodiment the guide vanes at least in a vane longitudinal portion between the line longitudinal direction and a vane longitudinal direction can have an angle of inclination which in the low-temperature shape is larger than in the high-temperature shape. For example, the guide vanes, in the low-temperature shape with their vane longitudinal direction extend transversely, that is perpendicularly to the line longitudinal direction, while in the high-temperature shape they include an acute angle with the line longitudinal direction. With decreasing angle of inclination the through-flow resistance decreases.

Additionally or alternatively, it can be provided that the guide vanes at least in a vane longitudinal portion between the line longitudinal direction and a vane profile running transversely to the vane longitudinal direction have a blade angle which in the low-temperature shape is greater than in the high-temperature shape. The greater the blade angle the greater is the flow deflection on the vane profile and the greater, too, is the through-flow resistance of the mixer. A minimal through-flow resistance of the mixer or flow circulation resistance of the guide vane is obtained if the blade angle assumes the value of zero, so that the vane profile then extends parallel to the line longitudinal direction. A maximum through-flow resistance of the mixer or a maximum flow circulation resistance of the guide vane is obtained if the guide vane profile extends transversely to the line longitudinal direction.

Additionally or alternatively, the guide vanes along their vane longitudinal direction can have a twist which in the high-temperature shape is more or differently pronounced than in the low-temperature shape. In the case of guide vanes which in the assembled state protrude into the flow-conducting line in a free-standing manner the blade angle in the case of a twist decreases from the outside to the inside. This angular difference between outer blade angle and inner blade angle in the low-temperature shape can be smaller than in the high-temperature shape, with which the twist is more pronounced. Likewise, upon changing from the low-temperature shape to the high-temperature shape the direction of rotation of the twist can reverse. Through this, the flow resistance on the one hand and the mixing effectiveness on the other hand can also be varied.

With another embodiment the mixer can comprise an annular body from which the guide vanes stand away radially to the inside. The annular body in the assembled state can extend coaxially to the line. With the help of the annular body the mixer can be designed as component that can be produced separately from the line, which can be installed in the respective line. For example, the mixer can be produced particularly cost-effectively if the guide vanes and the annular body are formed of a single plate component. For example, the mixer can be produced in one piece from this plate component through forming.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference characters refer to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
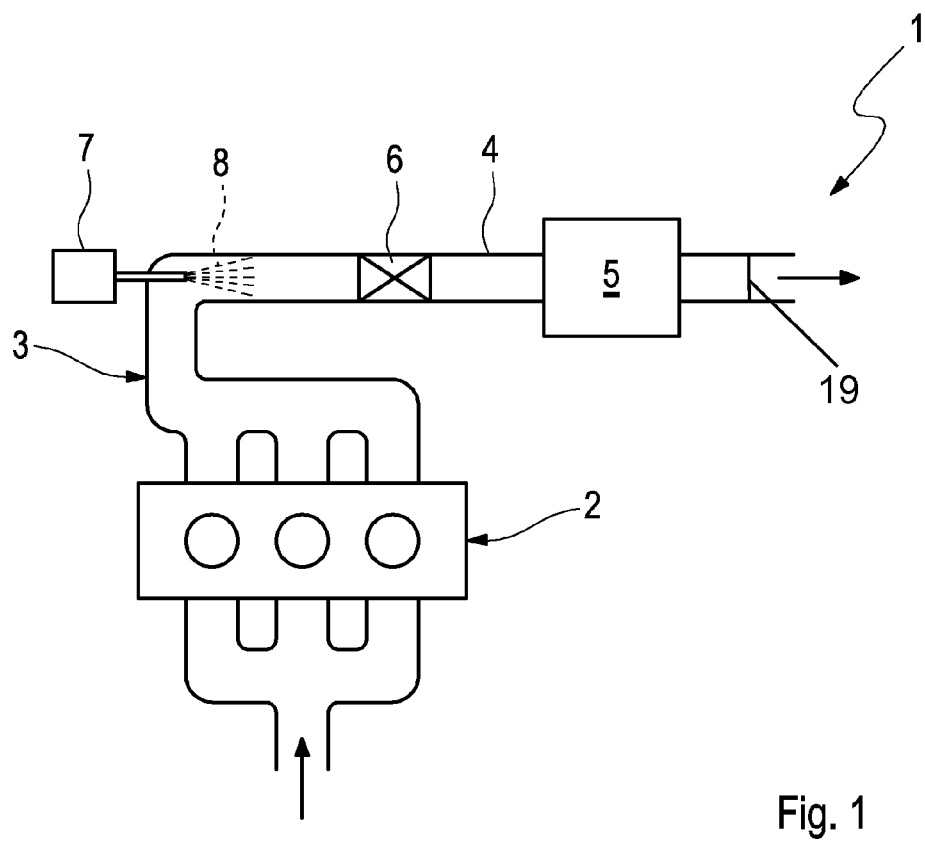
FIG. 1 is a greatly simplified schematic representation in the manner of a circuit diagram of a combustion engine with exhaust system according to the invention.

Referring to the drawings in particular, according to FIG. 1, an exhaust system 1 is provided for discharge of exhaust gases of a combustion engine 2. The exhaust system 1 can be arranged in a motor vehicle. The exhaust system 1 comprises an exhaust gas train 3, having an exhaust line 4 and at least one exhaust gas treatment device 5 which is incorporated in the exhaust line 4. In addition, the exhaust system 1 comprises a static mixer 6 which is likewise arranged in the exhaust line 4.

Preferentially, the exhaust gas treatment device 5 is designed as SCR-catalytic converter which in the following is likewise designated with 5. In this case, the mixer 6 is arranged in the exhaust line 4 upstream of the SCR-catalytic converter 5. In addition to this, the exhaust system 1 shown comprises an injection device 7, with the help of which a liquid reduction agent 8 can be injected into the exhaust gas train 3 or in the exhaust line 4. The mixer 6 in this case is positioned in the exhaust line 4 downstream of the injection device 7. In other words, the mixer 6 is arranged in the exhaust line 4 between the injection device 7 and the SCR-catalytic converter 5.

The mixer 6 serves for the mixing of the exhaust gas flow charged with the injected reduction agent within the exhaust line 4. Generally, the mixer 6 serves for the mixing of a flow in a line (exhaust line 4) conducting the flow.

Alternatively to this, the exhaust gas treatment device 5 can also be designed as oxidation catalytic converter which in the following is likewise designated 5. Downstream of the oxidation catalytic converter 5 a particle filter 19 as additional exhaust gas treatment device can then be practically arranged in the exhaust line 4. This is preferably the case with a combustion engine 2 designed as diesel engine. In this case, the oxidation catalytic converter 5 is a diesel oxidation catalytic converter 5 or, abbreviated, DOC 5, while the particle filter 19 then is a diesel particle filter 19. With such an embodiment the mixer 6 is arranged in the exhaust line 4 upstream of the oxidation catalytic converter 5. In addition to this, the exhaust system 1 again comprises an injection device 7, with the help of which a liquid fuel 8 can, according to the invention, be injected into the exhaust gas train 3 or into the exhaust line 4. Here, the mixer 6 is positioned in the exhaust line 4 downstream of the injection device 7. In other words, the mixer 6 is arranged in the exhaust line 4 between the injection device 7 and the oxidation catalytic converter 5.

The mixer 6 according to the invention serves for the mixing of the exhaust gas flow charged with injected fuel 8 within the exhaust line 4. In general, the mixer 6 again serves for the mixing of a flow in a line (exhaust line 4) conducting the flow.

The injected fuel 8 is converted on the oxidation catalytic converter 5, during which heat develops, which is picked up by the exhaust gas and transported to the following components of the exhaust system 3, in order to for example rapidly heat these to operating temperature in the case of a cold start. In the example shown the heat can be transported to the particle filter 19 in order to heat the latter to a self-ignition temperature of the particles deposited therein, in order to initiate a regeneration of the particle filter 19 in this manner.

Figure 2:
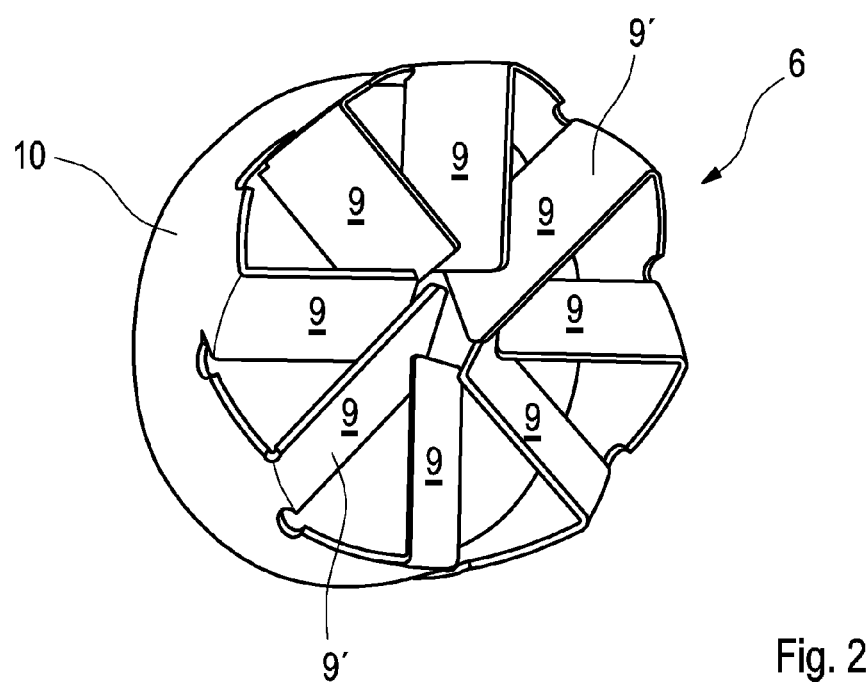
FIG. 2 is a perspective view of a mixer according to the invention.

According to FIG. 2, the mixer 6 has several guide vanes 9. With the embodiment shown in FIG. 2 these can be arranged star-shaped. The mixer 6 can comprise an annular body 10 whose for example circular outer cross section is complementarily shaped to an inner cross section of the line 4. The guide vanes 9 in the example stand away from this annular body 10 radially to the inside. Preferably, the guide vanes 9 and the annular body can be produced of a single sheet metal part. To this end, a flat sheet metal strip can for example be cut or stamped in order to cut out the guide vanes 9. Through folding or angular bending of the guide vanes 9 and through forming of the remaining sheet metal strip the annular body 10 with the guide vanes 9 and thus the mixer 6 can be formed. Practically, the guide vanes 9 stand away from the annular body 10 to the inside only so far that they do not touch each other. Preferentially, all guide vanes 9 thus protrude with one end in a free-standing manner into the cross section through which a flow can flow. In the assembled state of the mixer 6 the guide vanes 9 thus protrude into the line 4 in a free-standing manner. In the example, two guide vanes 9' are provided with bevelled inner ends and arranged located diametrically opposite each other. The remaining guide vanes 9 do not have such bevelled inner ends but face ends running transversely to the vane longitudinal direction. The two guide vanes 9' with bevelled face ends are each larger in their longitudinal direction than a radius of the inner cross section of the annular body 10. In contrast with this, the other guide vanes 9 are shorter in their longitudinal direction than the radius of the annular body 10.

Independent of how the guide vanes 9 are arranged and/or configured within the mixer 6, the mixer 6 is characterized in that its guide vanes 9 are produced of a shape memory alloy. Here, the guide vanes 9 are designed and constructed with the help of the shape memory alloy so that below a predetermined limit temperature they have at least one low-temperature shape and above this limit temperature, have at least one high-temperature shape. The shape of the guide vanes 9 determines the through-flow resistance of the mixer 6. The low-temperature shape is selected so that a higher through-flow resistance than in the high-temperature shape is obtained. In other words, above the limit temperature the mixer 6 has a lower through-flow resistance than below the limit temperature.

The shape memory alloy for the production of the guide vanes 9 can be selected so that the guide vanes 9 above the limit temperature increasingly change their high-temperature shape with rising temperature in the direction of decreasing through-flow resistance. This produces a quasi analogue relationship between temperature change and shape change of the guide vanes 9.

Alternatively to this, the shape memory alloy can be equipped for producing the guide vanes 9 also as two-shape memory alloy in such a manner that the guide vanes 9 below the limit temperature only have a single low-temperature shape and above the limit temperature only a single high-temperature shape. In the process thermal expansion effects and transitionary states in the region of the limit temperature may still occur. Such a transition region can comprise for example plus or minus 10% of the limit temperature. Through this configuration a quasi digital relationship between temperature change and shape change is obtained. It is clear, that in principle mixed forms or intermediate forms of the analogue or digital relationships described here can also be realized.

Figure 3:
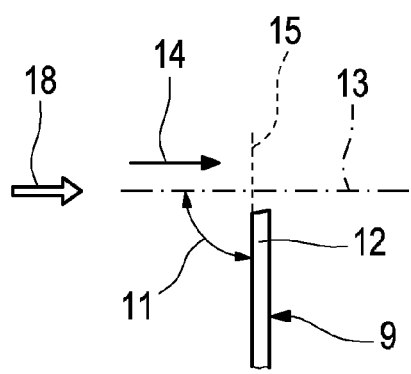
FIG. 3a is a view of a guide vane transversely to a vane longitudinal direction in a low-temperature shape.
FIG. 3b is a view of a guide vane transversely to a vane longitudinal direction in a high-temperature shape.
Figure 3:
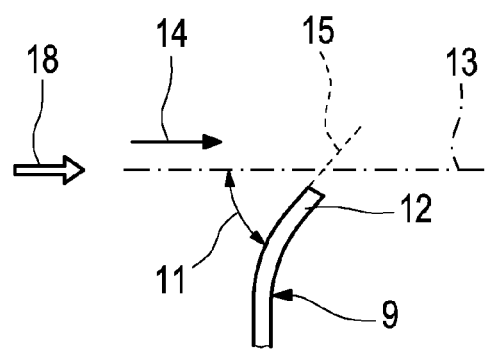

FIGS. 3a and 3b shows an angle of inclination 11 assumed by the respective guide vane 9 at least with a free-standing inner end portion 12. This angle of inclination 11 lies between a line longitudinal direction 13 extending coaxially to the line 4 and which runs parallel to the flow 14 conducted in the line 4 and represented by an arrow and a vane longitudinal direction 15, with which the respective guide vane 9 protrudes into the cross section through which a flow can flow. The configuration of the respective guide vane 9 with the help of the shape memory alloy can be designed in such a manner that this angle of inclination 11 in the low-temperature shape shown in FIG. 3a is greater than in the high-temperature shape shown in FIG. 3b. With decreasing angle of inclination 11 the flow circulation resistance of the respective guide vane 9 drops and thus the through-flow resistance of the mixer 6.

Figure 4:
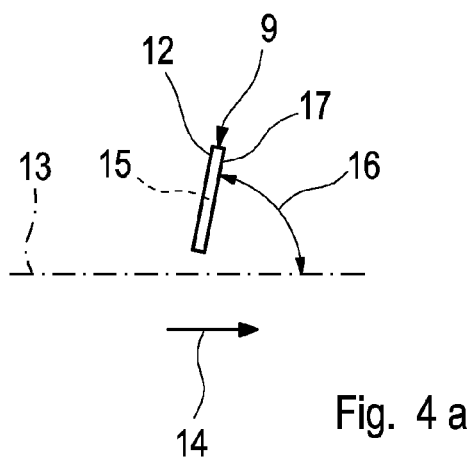
FIG. 4a is a view of the guide vane parallel to the vane longitudinal direction in the low-temperature shape.
FIG. 4b is a view of the guide vane parallel to the vane longitudinal direction in the high-temperature shape.
Figure 4:
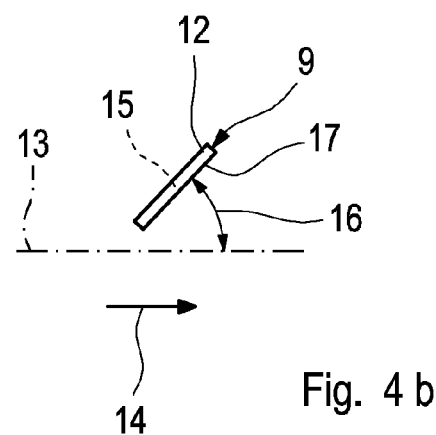

FIGS. 4a and 4b show a further possible configuration which can be realized additionally or alternatively to the configuration shown in FIGS. 3a and 3b. FIGS. 4a and 4b show a blade angle 16 assumed by the respective guide vane 9 relative to the line longitudinal direction 13 at least in an end portion 12 protruding into the flow cross section. Here, this blade angle 16 is measured against a vane profile 17 which extends transversely to the vane longitudinal direction 15. Obviously the respective guide vane 9 in conjunction with the shape memory alloy can be designed so that the blade angle 16 in the low-temperature shape shown in FIG. 4a is greater than in the high-temperature shape shown in FIG. 4b. With decreasing blade angle 16 the flow circulation resistance of the respective guide vane 9 drops and thus the through-flow resistance of the mixer 6.

Such a change of the blade angle 16 on the free-standing end portion 12 of the respective guide vane 9 can be realized for example in that the respective guide vane 9 along its vane longitudinal direction 15 comprises a twisted portion. Such a twisted portion is characterized in that the twisted guide vane 9 radially outside, that is more preferably at the transition to the annular body 10 in the profile 17 has another blade angle 16 than at its end 12 located inside. For example, the blade angle 16 can decrease or increase from outside to the inside. The twisted portions in the low-temperature shape can differ from those in the high-temperature shape. For example it can be provided that the twisted portion of the respective guide vane 9 is more pronounced in the high-temperature shape than in the low-temperature shape. Because of this, the blade angle 16 for example can be reduced in the region of the inner end 12 at the transition to the high-temperature shape. It is likewise possible that the twisted portion changes its sign at the transition from the low-temperature to the high-temperature shape. For example, the respective guide vane 9 can have a blade angle 16 for example of 45° radially outside, that is for example on the annular body 10, which is retained both in the low-temperature shape as well as in the high-temperature shape. However, in the low-temperature shape the twisted portion of the respective guide vanes 9 however results in that at the inner end 12 a greater blade angle 16 materializes, for example of 60°. With the high-temperature shape in contrast a smaller blade angle 16 can materialize at the inner end 12, which can for example be around 30°.

FIGS. 3a and 3b additionally make it clear in this case that the respective guide vane 9 in its low-temperature shape shown in FIG. 3a protrudes further into the cross section of the line 4 through which a flow can flow transversely to the line longitudinal direction 13, that is in the direction of the vane longitudinal direction 15 than in the high-temperature shape according to FIG. 3b. For example, the line longitudinal direction 13 in FIGS. 3a and 3b represents a longitudinal center axis of the line 4. Obviously the face end of the respective guide vane 9 in the low-temperature shape according to FIG. 3a is closer to said longitudinal centre axis than in the high-temperature shape according to FIG. 3b.

In addition, a projection is indicated through an arrow 18 in FIGS. 3a and 3b which extends parallel to the line longitudinal direction 13. This projection 18 of the guide vanes 9 in the low-temperature shape according to FIG. 3a creates a larger projection area than in the high-temperature shape according to FIG. 3b.

While specific embodiments of the invention have been shown and described in detail to illustrate the application of the principles of the invention, it will be understood that the invention may be embodied otherwise without departing from such principles.

What is claimed is:

1. A motor vehicle exhaust system for a combustion engine, the exhaust system comprising:
    an exhaust line;
    a static mixer arranged in said exhaust line, said static mixer comprising an annular body and a plurality of guide vanes, said annular body comprising a longitudinal axis and an axial extent, said plurality of guide vanes extending from said axial extent to the inside of the static mixer in a radial direction with respect to said axial extent and said longitudinal axis, said plurality of guide vanes comprising a shape memory alloy having a low-temperature shape below a predetermined limit temperature and a high-temperature shape above said limit temperature, said high-temperature shape differing from said low-temperature shape and said high-temperature shape providing a reduced through-flow resistance of the mixer compared to through-flow resistance of the mixer with said low-temperature shape.

2. The exhaust system according to claim 1, further comprising:
    an SCR-catalytic converter connected to said exhaust line;
    an injector located upstream of said SCR-catalytic converter, wherein said plurality of guide vanes are configured to change shape to provide a decreasing through-flow resistance with rising temperature, each of said plurality of guide vanes being connected to said annular body, each of said plurality of guide vanes extending from a first position to a second position in said radial direction with respect to said longitudinal axis, said first position being located at or adjacent to a portion of said annular body, said second position being located at a radially spaced location from said portion of said annular body with respect to said longitudinal axis, wherein at least a portion of each of said plurality of guide vanes extends transversely to a flow of fluid flowing through said exhaust line.

3. The exhaust system according to claim 1, wherein said shape memory alloy comprises a two-shape memory alloy, whereby the guide vanes have only said low-temperature shape below the limit temperature and only said high-temperature shape above the limit temperature except for thermal expansion effects and except for transitionary states of the limit temperature, at least a portion of at least one of said guide vanes being perpendicular to a flow of fluid flowing through said static mixer with said at least one of said guide vanes having said low-temperature shape.

4. The exhaust system according to claim 1, wherein said guide vanes at least in a vane longitudinal portion between a line longitudinal direction and a vane longitudinal direction have an angle of inclination which in said low-temperature shape is greater than in said high-temperature shape.

5. The exhaust system according to claim 1, wherein said guide vanes at least in a vane longitudinal portion between a line longitudinal direction and a vane profile running transversely to a vane longitudinal direction have a blade angle which in said low-temperature shape is greater than in said high-temperature shape.

6. The exhaust system according to claim 1, wherein said guide vanes along a vane longitudinal direction have a twisted portion, wherein the twisted portion present in said high-temperature shape differs from the twisted portion present in said low-temperature shape with respect to at least one of a twisted portion direction and a twisted portion magnitude.

7. The exhaust system according to claim 1, wherein said guide vanes in said low-temperature shape further protrude into the line, in a direction transverse to a line longitudinal direction, than in said high-temperature shape.

8. The exhaust system according to claim 1, wherein said guide vanes in a projection orientated parallel to a line longitudinal direction in said low-temperature shape have a larger projection area than in said high-temperature shape.

9. The exhaust system according to claim 1, wherein each of said guide vanes has an end portion, said end portion of each of said guide vanes being located radially opposite said end portion of another one of said guide vanes with respect to said longitudinal axis, each of said guide vanes being located at a spaced location from another one of said guide vanes in said radial direction and an axial direction with respect to said longitudinal axis.

10. The exhaust system according to claim 9, wherein said guide vanes and the annular body are formed of a single sheet metal part.

11. The exhaust system according to claim 1, wherein each of said guide vanes has one freely extending end protruding into a cross sectional area through which one or more fluids flow, wherein at least a portion of each of said guide vanes extends transversely to a flow of said one or more fluids, each of said guide vanes having an end portion, said end portion of each of said guide vanes being located diametrically opposite said end portion of another one of said guide vanes, said axial extent being parallel to a flow of said one or more fluids.

12. The exhaust system according to claim 10, wherein said plurality of guide vanes are configured to change shape continuously with changing temperature to provide a decreasing through-flow resistance with rising temperature, each of said guide vanes having an end portion located at a spaced location from a portion of said annular body, said end portion of each of said guide vanes facing said end portion of another one of said guide vanes in said radial direction, said end portion of each of said guide vanes being located at a spaced location from said end portion of another one of said guide vanes.

13. The exhaust system according to claim 10, wherein said shape memory alloy comprises a two-shape memory alloy, whereby the guide vanes have only said low-temperature shape below the limit temperature and only said high-temperature shape above the limit temperature except for thermal expansion effects and except for transitionary states of the limit temperature.

14. The exhaust system according to claim 10, wherein said guide vanes at least one of:
have an angle of inclination which in said low-temperature shape is greater than in said high-temperature shape at least in a vane longitudinal portion between a line longitudinal direction and a vane longitudinal direction;
have a blade angle which in said low-temperature shape is greater than in said high-temperature shape at least in a vane longitudinal portion between a line longitudinal direction and a vane profile running transversely to a vane longitudinal direction;
have a twisted portion along a vane longitudinal direction, wherein the twisted portion present in said high-temperature shape differs from the twisted portion present in said low-temperature shape with respect to at least one of a twisted portion direction and a twisted portion magnitude;
further protrude into the line in said low-temperature shape, in a direction transverse to a line longitudinal direction, than in said high-temperature shape; and
have a larger projection area in said low-temperature shape than in said high-temperature shape in a projection orientated parallel to a line longitudinal direction.

15. A motor vehicle exhaust system for a combustion engine, the exhaust system comprising:
an exhaust mixer receiving a flow of exhaust gas, said exhaust mixer comprising an annular body and a plurality of guide vanes comprised of a shape memory alloy having a low-temperature shape below a predetermined limit temperature and a high-temperature shape above said limit temperature, said high-temperature shape differing from said low-temperature shape and said high-temperature shape providing a reduced through-flow resistance of the mixer compared to through-flow resistance of the mixer with said low-temperature shape, said annular body comprising an axial extent said annular body further comprising a longitudinal axis, each of said guide vanes being connected to said annular body at a position located along said axial extent, wherein at least a portion of each of said guide vanes extends from said axial extent to the inside of the exhaust mixer in a radial direction with respect to said longitudinal axis, said axial extent being parallel to said longitudinal axis.

16. The exhaust system according to claim 15, further comprising:
an exhaust line;
an SCR-catalytic converter connected to said exhaust line;
an injector located upstream of said SCR-catalytic converter, wherein said exhaust mixer receives an axial flow of said exhaust gas, said axial flow of said exhaust gas being parallel to said exhaust line, at least a portion of each of said guide vanes extending transversely to the longitudinal axis and transversely to said axial flow of said exhaust gas, each of said guide vanes being located at a spaced location from another one of said guide vanes in said radial direction and an axial direction with respect to said longitudinal axis, at least a portion of at least one of said guide vanes being perpendicular to said axial flow of said exhaust gas with said at least one of said guide vanes having said low-temperature shape.

17. A motor vehicle exhaust system for a combustion engine, the exhaust system comprising:
an exhaust line;
an exhaust mixer connected to said exhaust line, wherein said exhaust mixer receives a flow of exhaust fluid via said exhaust line, said exhaust mixer comprising an annular body, said annular body comprising an axial extent, said annular body having a longitudinal axis, said exhaust mixer comprising a plurality of guide vanes, said plurality of guide vanes being connected to said annular body, said plurality of guide vanes comprising a shape memory alloy, at least a portion of at least one of said plurality of guide vanes extending radially from said axial extent to the inside of the exhaust mixer with respect to said longitudinal axis, wherein said at least said portion of at least one of said plurality of guide vanes is located in the inside of said exhaust mixer.

18. The exhaust system according to claim 17, further comprising:
an SCR-catalytic converter connected to said exhaust line;
an injector located upstream of said SCR-catalytic converter, wherein said shape memory alloy has a low-temperature shape below a predetermined limit temperature and a high-temperature shape above said limit temperature, said high-temperature shape differing from said low-temperature shape and said high-temperature shape providing a reduced through-flow resistance of the mixer compared to through-flow resistance of the mixer with said low-temperature shape, each of said guide vanes having an end portion located at spaced location from a portion of said annular body, said end portion of each of said guide vanes facing said end portion of another one of said guide vanes in said radial direction, said end portion of each of said guide vanes being located at a spaced location from said end portion of said another one of said guide vanes in said radial direction and in an axial direction with respect to said longitudinal axis, wherein at least a portion of each of said guide vanes extends transversely to said flow of exhaust fluid, said at least said portion of at least one of said guide vanes being perpendicular to said axial flow of said exhaust gas with said at least one of said guide vanes having said low-temperature shape.

* * * * *